(12) United States Patent
Staude

(10) Patent No.: US 6,443,236 B2
(45) Date of Patent: Sep. 3, 2002

(54) THREE-POINT HITCH FOR A TRACTOR

(75) Inventor: Rudolf Staude, Wuppertal (DE)

(73) Assignee: Cramer Kupplung GmbH & Co. KG, Essen (DE)

( * ) Notice: Subject to any disclaimer, the term of this patent is extended or adjusted under 35 U.S.C. 154(b) by 0 days.

(21) Appl. No.: 09/760,351

(22) Filed: Jan. 11, 2001

(30) Foreign Application Priority Data

Jan. 12, 2000 (DE) .......................................... 100 00 846

(51) Int. Cl.[7] .............................................. A01B 59/041
(52) U.S. Cl. ..................................................... 172/439
(58) Field of Search .............................. 172/439, 447, 172/448, 7, 2, 450, 677, 679, 680; 280/455.1, 474, 460.1; 701/50

(56) References Cited

U.S. PATENT DOCUMENTS

| | | | | |
|---|---|---|---|---|
| 4,519,623 A | * | 5/1985 | Orthman | 280/460.1 |
| 5,361,850 A | * | 11/1994 | Muller et al. | 172/450 |
| 6,089,328 A | * | 7/2000 | Moore et al. | 172/447 |
| 6,250,396 B1 | * | 6/2001 | Gengler et al. | 172/7 |

* cited by examiner

*Primary Examiner*—Robert E. Pezzuto
(74) *Attorney, Agent, or Firm*—Herbert Dubno (57) ABSTRACT

A three-point hitch for a tractor on which an attachment can be mounted has its lower links pivotally connected to the tractor at the tractor side and actuated by hydraulic cylinders in mounts on a hitch bracket. The upper link can be a piston-and-cylinder arrangement pivotally connected to the hitch bracket.

10 Claims, 7 Drawing Sheets

THREE-POINT HITCH FOR A TRACTOR

FIELD OF THE INVENTION

Our present invention relates to a three-point hitch for a tractor and capable of raising and lowering and/or swinging an attachment which can be mounted by the three-point hitch on the front or rear of the tractor.

BACKGROUND OF THE INVENTION

The three-point hitch of a tractor can be utilized to affix an attachment to the tractor and for raising, lowering or swinging that attachment. The attachment is usually an agricultural appliance or a soil-working or ground-working tool. Typical attachments for a tractor are attachments such as blades or the like for modifying ground contours, agricultural attachments such as fertilizing, harvesting and cultivating attachments including plows, harrows, manure spreaders and the like.

The three-point hitch permits the position of the attachment to be raised or lowered on the tractor and the three-point hitch also serves to enable the working height to be adjusted.

For this purpose the three-point hitch normally has some actuator for the lower links, the upper link being generally passive.

In modern tractors, the hitch may also be associated with a control system for maintaining a position of the attachment with respect to the ground in spite of irregularities in the latter.

OBJECTS OF THE INVENTION

It is an object of the present invention to provide a three-point hitch for the purposes described which is especially simple and reliable and can provide an optimum lifting force characteristic, a reduced overall height or size and significantly less weight than earlier three-point hitches.

Another object of the invention is to provide a low cost three-point hitch of high versatility.

SUMMARY OF THE INVENTION

These objects are attained, in accordance with the invention in a three-point hitch for a tractor or other vehicle upon which an attachment may be mounted which is capable of raising or lowering or swinging the attachment and which can be mounted on the front and/or the rear of the tractor. According to the invention, a hitch bracket is provided for mounting on the tractor and the lower links are swingable on the hitch bracket or relative to the hitch bracket at the tractor side at lower pivots while the upper link is swingable on the hitch bracket at the tractor side at an upper pivot.

The lower links have, at their attachment side or ends lower coupling points while the upper link has at the attachment side an upper coupling point for connection to the attachment at points which lie at the vertices of a triangle. The lower links and/or the upper link can be provided with piston-and-cylinder units for raising, lowering and/or swinging them. When reference is made to pivots at the tractor side, of course, those pivots need not be provided directly on the tractor but need only be provided on the side of the links toward the tractor, e.g. on the hitch bracket, on the tractor itself or a structure intervening between the links and the tractor. The three-point hitch of the present invention is suitable for attachment to the front and/or rear on a tractor and can be a unit premounted with all of its components and preadjusted so that it can be attached to the tractor as a unit or can be affixed to a tractor which does not have such a hitch. The hitch, therefore, can be used to retrofit a tractor or other vehicle with the system for raising, lowering and swinging the coupling points for attachment.

The hitch bracket itself may be equipped with a raisable and lowerable connection to the tractor and can be selectively used as a pickup hitch or an adjustable draw bar or the like. The invention, in addition, provides a three-point suspension for an attachment with a kinematic relationship corresponding to a linear or slightly progressive lifting force characteristic. It is useful for large and small loads and can provide both a longitudinal and lateral inclination adjustment. The invention also provides that stabilizers can be connected to the lower links. The stabilizers can be, for example, piston-and-cylinder units which are pivotally connected on the one hand to the tractor and on the other hand to the lower links. In a preferred embodiment, however, the stabilizers can be piston-and-cylinder units which are integrated in the lower links and are oriented substantially perpendicular to the longitudinal axis of the tractor and can have piston rods carrying stabilizer jaws which engage cams provided on the hitch bracket and extending in the direction of the tractor longitudinal axis. The lateral forces can thus be taken up by these piston-and-cylinder units.

According to a feature of the invention, lever or other force-transmission ratio devices can be provided to control the sway or effect the raising and lowering movement. With such devices, relatively small piston-and-cylinder units can be used with comparatively short strokes.

The invention enables the system to be free from the customary connections to the rear axle of the tractor. After lifting of the attachment from the ground or out of the ground, the electronic circuitry which may be coupled to the stabilizers and other piston-and-cylinder units and which can be responsive to detection of the stroke thereof can automatically switch the stabilizers into a "rigid" status.

The stroke can be measured by a potentiometer or limit switch. The three-point hitch of the invention can fulfill all of the requirements established by the German Industrial Standards (DIN) and the VDI standards for upper links, lower links, lifting rods and three-point hitches for rear mounting on a tractor, including the safety requirements.

The lower links can be formed from two plug-in link parts whereby the front link parts can have receptacles for the stabilizers or can be premounted with the stabilizers.

Both sides of the hitch bracket can be equipped with mounts, especially mounting cheeks for the cylinder unit acting upon the lower links. The mounts have U-shaped cross sections and can partly or fully receive the cylinder units. The cylinder units can be pivotally connected, via appropriate bearings, with the mount while the lower end of the cylinder unit can be coupled with the lower link by a respective fork and, if desired, with bearings at the pivots. The result is a so-called "drawing cylinder".

In another embodiment, the piston unit is connected pivotally via an appropriate bearing arrangement with the mount while at the upper end, the cylinder unit works via a lever to actuate the rod. Bearings are provided here too between the pivot connection of the cylinder unit with the lever and the lever with the mount. A further bearing arrangement can be provided between the rod and the lever. In this case the cylinder unit is a lifting cylinder.

Of course, the upper link can be formed as a piston-and-cylinder unit as well and the latter can act on the triangular construction interconnecting the coupling points. The hitch described is simple and reliable and is of comparatively small size and weight so that it can be fabricated at lower cost than heretofore. The compact construction is a function in part of the rearward shift of the pivot points for the lower links as well as the shift in positions of the cylinder units. The arrangement and configuration of the stabilizers also contributes to a reduction in the size and weight of the three-point hitch.

The three-point hitch of the invention does not require mounting of a variety of components on the transmission casing of the tractor and there is more room at the back or front of the tractor, utilizing the system of the invention. The fact that the stabilizers act inwardly ensures a greater amount of space for the tractor cylinders. The stabilizers have been found to be highly advantageous for small tractors, i.e. tractors suitable for horticulture and viniculture. The cabling of the system can be independent of the mounting of the three-point hitch on the tractor and that, of course, can contribute to a saving in mounting costs. Another cost conserving feature is the elimination of any need to modify the transmission to accommodate parts of the three-point hitch. The three-point hitch of the invention also reduces the forces which are applied via the hitch bracket to the tractor.

BRIEF DESCRIPTION OF THE DRAWING

The above and other objects, features, and advantages will become more readily apparent from the following description, reference being made to the accompanying drawing in which.

SPECIFIC DESCRIPTION

In the drawing I have shown three-point hitches for a tractor 1 or some other towing or utility vehicle for raising, lowering and/or swinging an attachment which is to be affixed by this hitch on the rear of the tractor or on the front thereof.

The three-point hitch of the invention comprises a hitch bracket 3 which, at the tractor side of the lower links 5 can form lower pivots 4 and for the upper link 7 can form an upper pivot point 6.

The lower links 5 are usually connected with the tractor transmission housing via pins at the respective pivot points 4. This connection can be directly to the transmission housing or to the transmission housing via the bracket as may be advantageous.

At the side of the attachment, the lower links 5 have respective lower coupling points 8 which can be upwardly open notches engaging from beneath a bar of the attachment. In many cases the attachment can have a triangular structure 20 whose bar can rest in the notches 8. At the attachment side, moreover, the upper link 7 can be connected to the attachment, e.g. via the triangular structure 20, at an upper coupling point 9 also via a pin.

Figure 1:
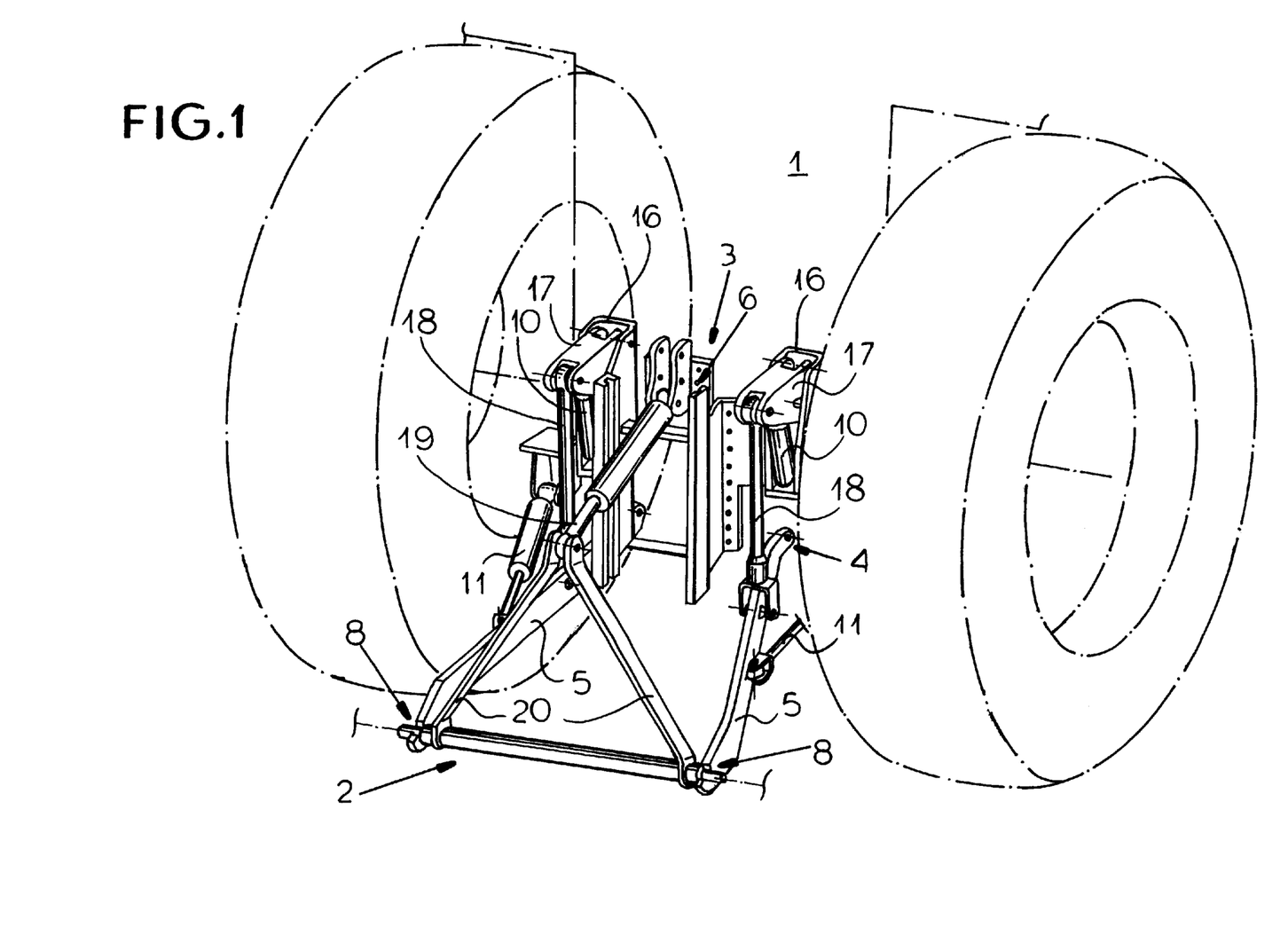
FIG. 1 is a perspective view of a three-point hitch located between two wheels of a tractor shown schematically.
Figure 2:
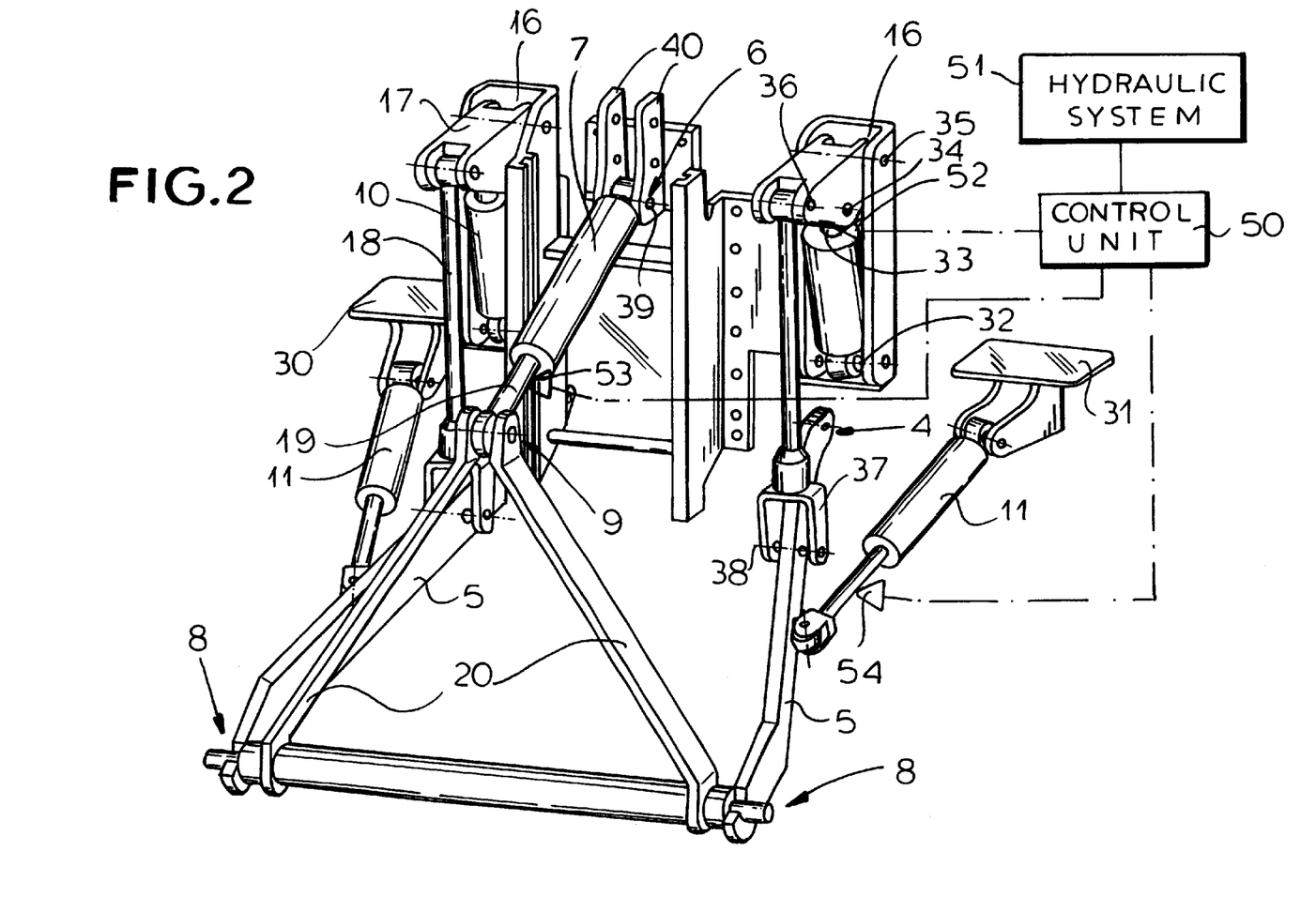
FIG. 2 is a detail perspective view of the hitch of FIG. 1 without the tractor wheels.
Figure 3:
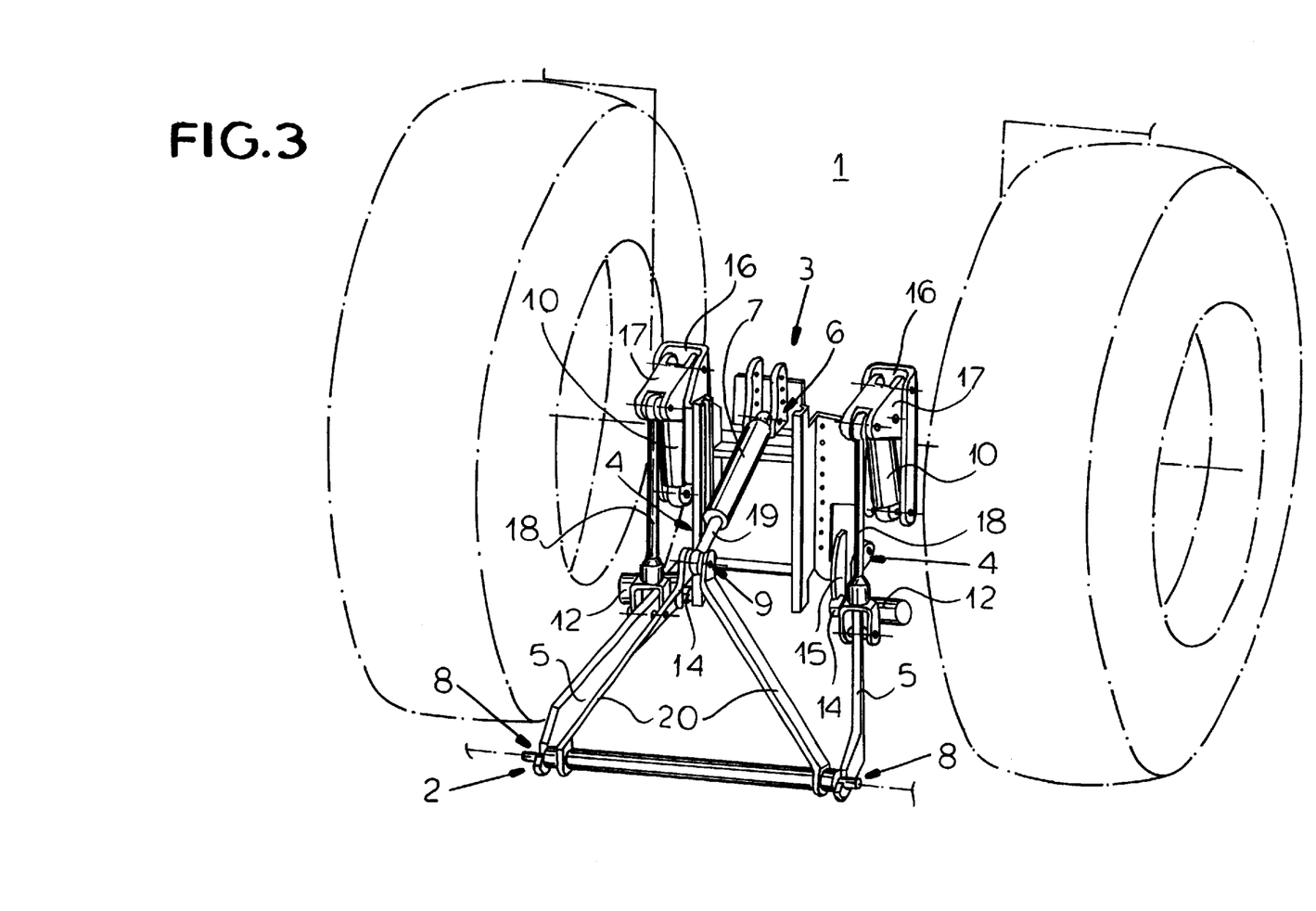
FIG. 3 is a view similar to FIG. 1 of a modified tractor hitch according to the invention.
Figure 4:
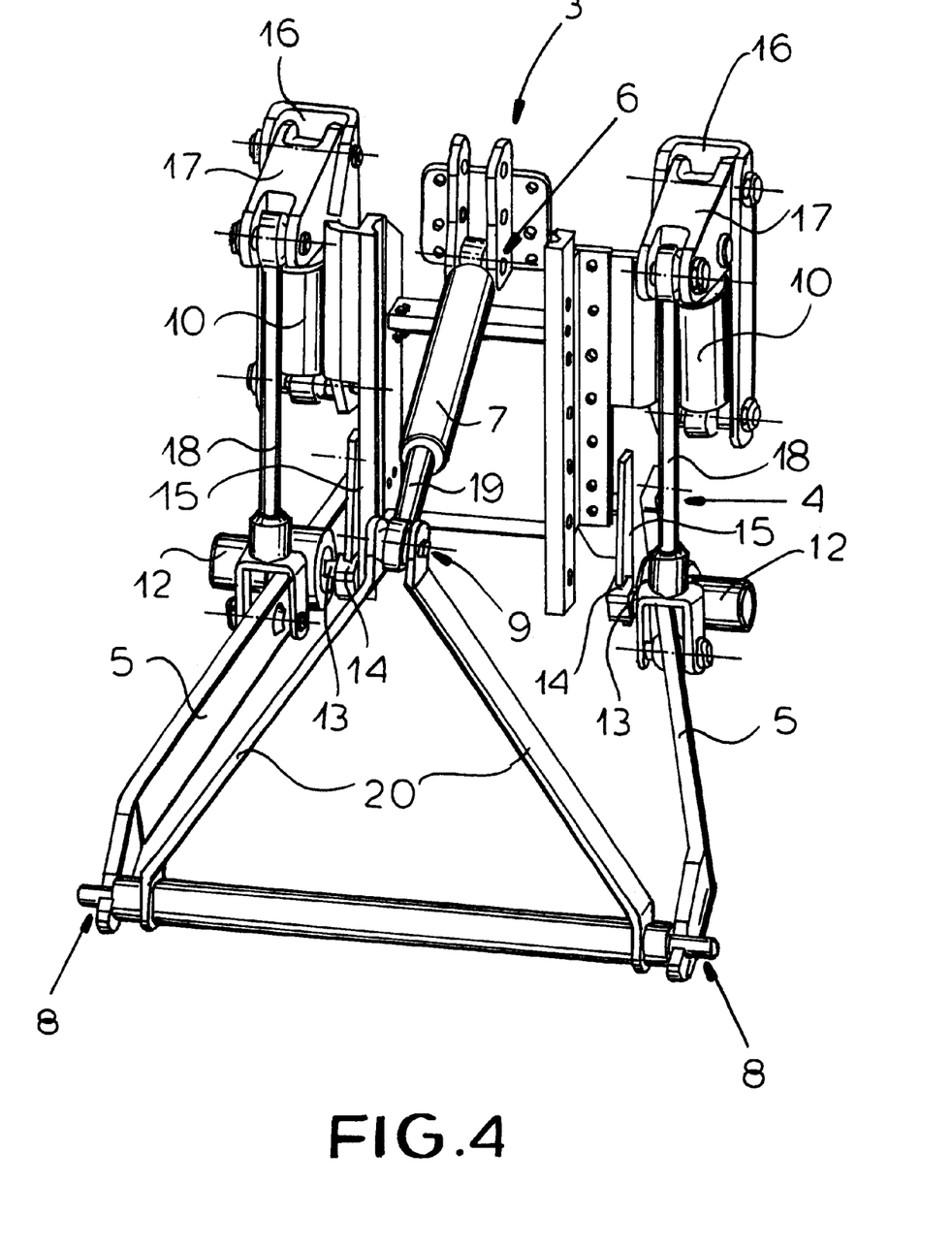
FIG. 4 is a view similar to FIG. 2 of the tractor hitch of FIG. 3.
Figure 5:
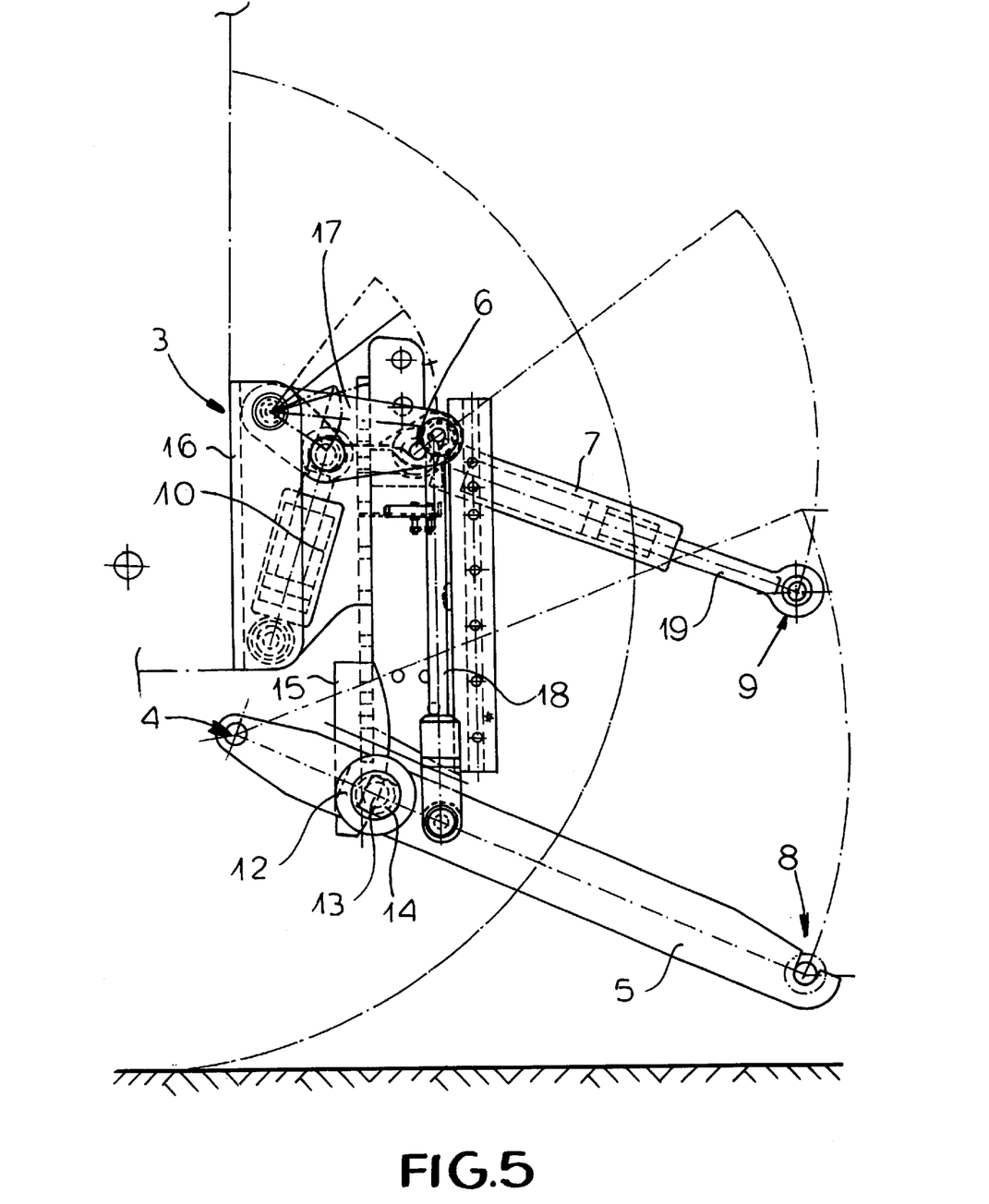
FIG. 5 is a side elevational view of the hitch of FIGS. 3 and 4 showing the kinematics thereof.

The lower links 5 are actuatable, i.e. raisable and lowerable, by piston-and-cylinder units 10. The upper link 7 in the embodiments shown can be formed by a piston-and-cylinder unit itself. The lower links 5 are connected to stabilizers 11 and 12. In the embodiment shown in FIGS. 1 and 2, the stabilizers are piston-and-cylinder units 11 which are connected directly to the tractor 1 by hinge plates 30 and 31. In the embodiments of FIGS. 3–7, the stabilizers comprise piston-and-cylinder units 12 integrated into the lower links 5 and oriented substantially orthogonally to the tractor axis which is parallel to the plane of the paper in FIG. 5.

Each of the piston rods of the cylinder units 12 in FIGS. 3–7 carries a stabilizing jaw 14 which engages a cam 15 extending in the direction of the longitudinal axis of the tractor. The lower links 5 can be formed by two plug-in link parts of which the front link part has a seat for the respective stabilizer 12.

The hitch bracket 3 has, on opposite sides thereof, mounting cheeks or mounts 16 for the piston-and-cylinder units 10 which act upon the lower links 5. These mounts 16 are of U-shaped cross section and receive the cylinder units 10.

In the embodiment of FIGS. 1–5, these cylinder units 10 are pivotally connected at 32 at their bottoms to the mounts 16 and have piston rods 33 which are pivotally connected at 34 to levers 17 which, in turn, are fulcrumed at 35 on the mounts 16. The levers 17, in turn, are articulated at 36 to lifting rods 18 whose forks 37 are pivotally connected at 38 to the respective links 5. The pivots formed at 32, 34, 35, 36 and 38 are provided with roller or ball-bearings or any other convenient type of low-play bearing, e.g. swivel bearings.

Similarly, the cylinder unit 7 forming the upper link can have a piston rod pivotally connected at 9 to the triangular structure 20 while the cylinder is pivotally connected at 39 to a pair of plates 40 forming part of the bracket 3. The pivots 9 and 39 also can be provided with appropriate bearings.

While the triangular structure 20 is preferred, it can be omitted and in such cases the upper and lower links can be provided with catcher jaws, hooks or the like for automatic grouping of pins or similar structures on the attachment directly. Such an arrangement has been shown in FIGS. 6 and 7. In this embodiment as well, the piston-and-cylinder units 10 are pivotally connected at their upper ends at 41 to the mounts 16 while their piston rods 42 engage via the forks 43 and the swivel bearings 44 the respective links 5. All of the bearings mentioned previously may also be swivel bearings as has been noted.

Figure 6:
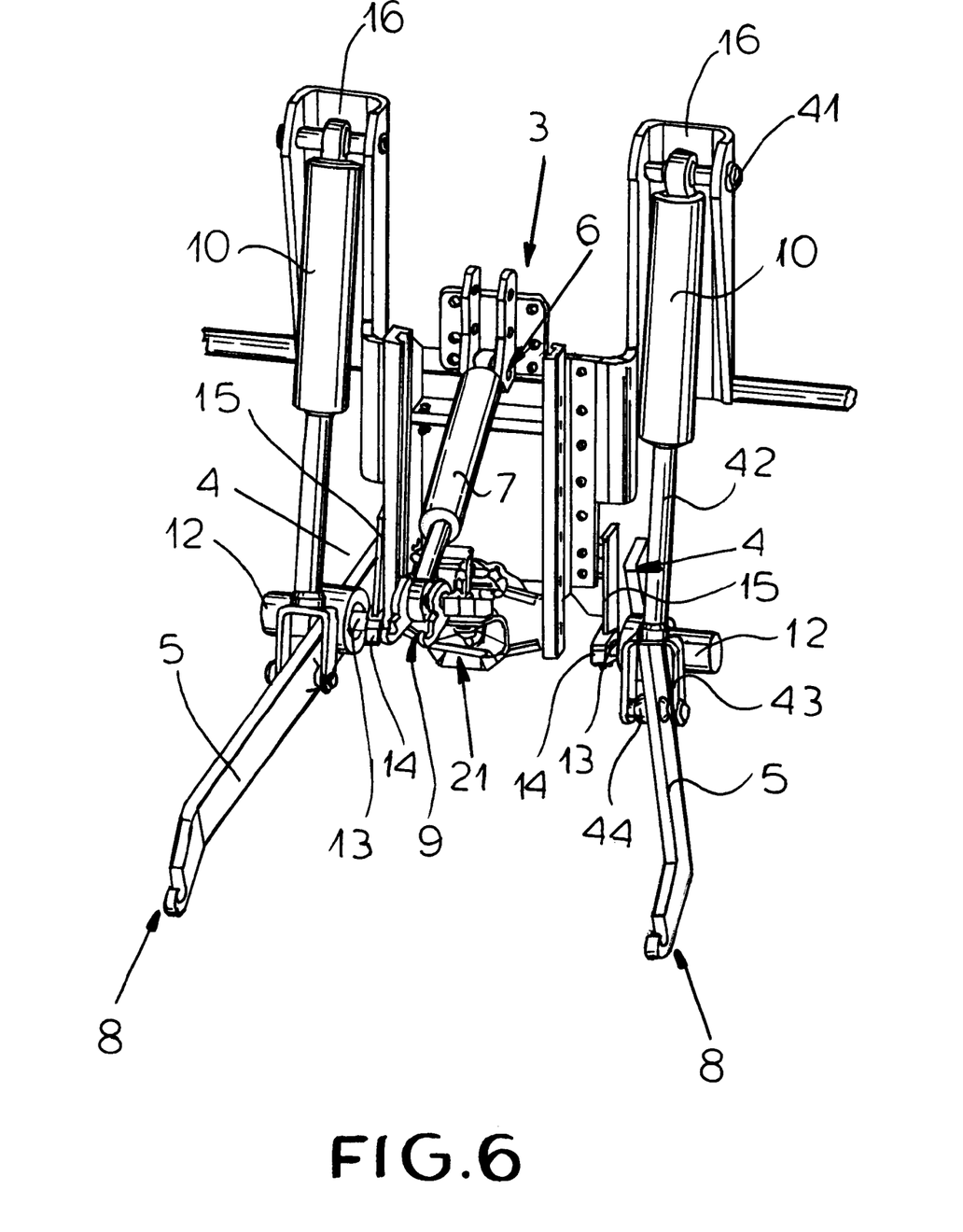
FIG. 6 is a perspective view illustrating a modified system.
Figure 7:
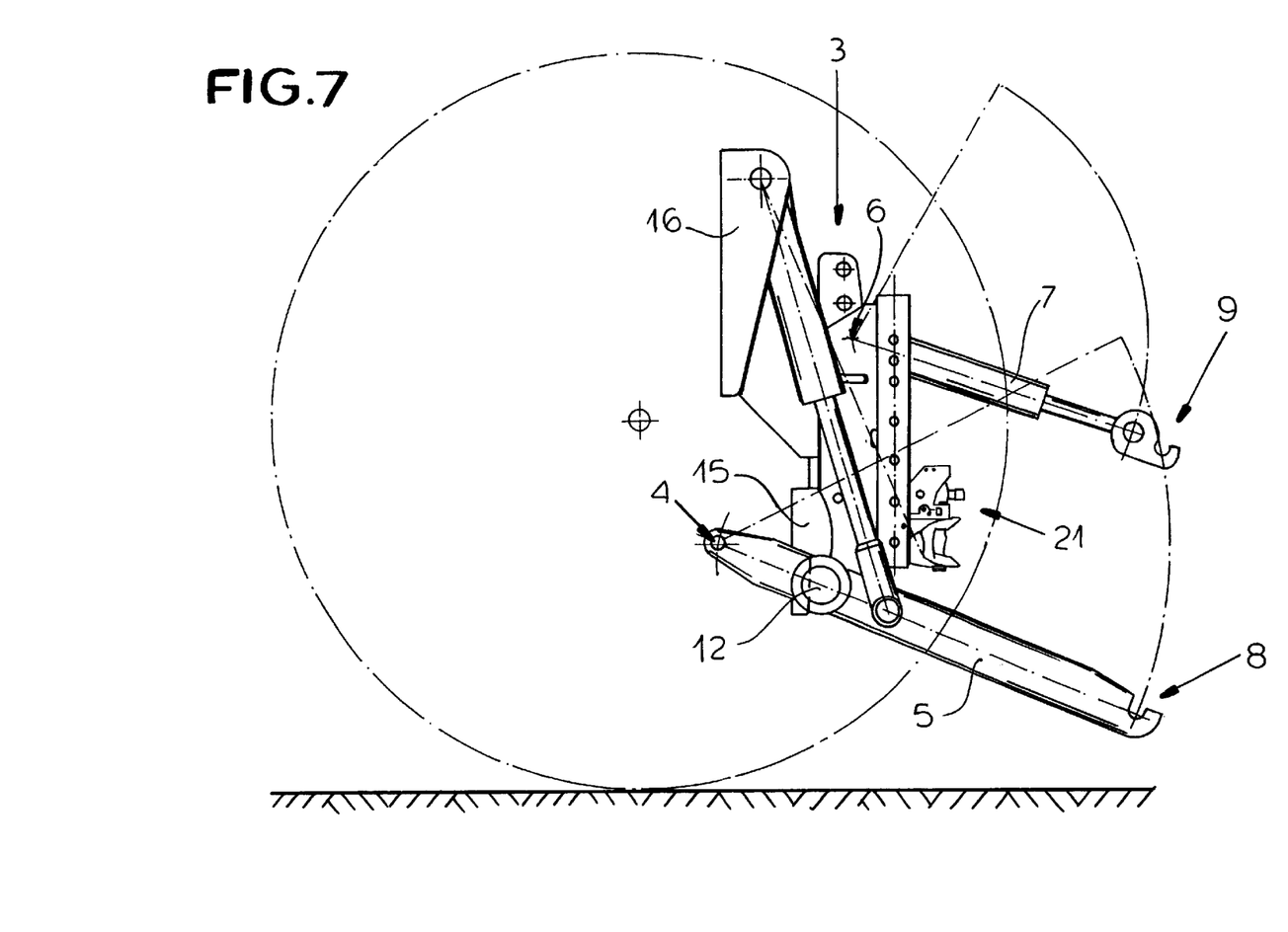
FIG. 7 is a side elevational view of the hitch of FIG. 6 showing the kinematics thereof.

The three-point hitch may also be provided with a trailer coupling 21 formed on the bracket 3. The trailer coupling shown in FIG. 6 is of the automatic type and is provided at a low point on the bracket 3 to allow maximum space for the other elements of the hitch and any attachments to be joined thereto.

The three-point hitch of the invention can be utilized effectively with attachments like plows which mainly are accommodated in the lower third of the lifting capacity of the hitch. The lower links 5 can be synchronously raised and lowered by the cylinder units 10 and the transverse inclination of the attachment 2 can be adjusted by varying the positions of the two lower links. The transverse inclination can be held constant over the entire vertical stroke or only a portion thereof. Usually, however, the transverse inclination is a function of the terrain. Advantageously, the inclination both in the longitudinal and in the transverse direction can be adjusted automatically or manually, the longitudinal inclination being a function of the extension of the upper link 7.

Where the lateral stabilization as well as the transverse and longitudinal inclinations are to be automatically adjusted and/or the lateral stabilization is to be turned on independently of the stroke or for boundary plowing or the like in horticulture or viniculture, a control unit 50 can be provided which operates the hydraulic systems 51 supplying the cylinders. The pistons in that case maybe provided with displacement sensors 52, 53 and 54, for example, signalling the positions of the pistons to the control unit 50. The tendency of the three-point hitch to swing from side to side is a function of the soil parameters (heavier or lighter soil) and can be limited through hydraulic throttling of the hydraulic fluid of the cylinders 11. The control unit 50, however, is preferably an electronic controller which can be programmed for different modes of operation and can respond to the positions of the various pistons.

I claim:

1. A three-point hitch for mounting an attachment on a tractor, said three-point hitch comprising:

a hitch bracket provided with means for selective attachment to a front or a rear of a tractor;

an upper link connected at a tractor-side thereof to said hitch bracket at an upper pivot;

a pair of lower links swingable at respective tractor sides thereof about respective lower pivots, said lower links having attachment-side coupling points and said upper link having an attachment-side coupling point adapted to connect said attachment to said hitch; and a pair of mounts on opposite sides of said hitch bracket flanking said upper linking a piston-and-cylinder unit connected between each mount of said hitch bracket and a respective one of said lower links for selectively raising, lowering and swinging said coupling points relative to said hitch bracket, wherein each of said mounts being a U-section housing receiving the respective piston-and-cylinder unit, wherein each of said piston-and-cylinder units engaging a lever connected by a fork to a rod articulated to the respective lower link, each of said levers being journaled in said mount by a respective bearing.

2. The three-point hitch defined in claim 1, further comprising away-limiting stabilizers connected to said lower links.

3. The three-point hitch defined in claim 2 wherein said sway- limiting stabilizers comprise piston-and-cylinder units pivotally connected to said tractor and to the respective lower links.

4. The three-point hitch defined in claim 2 wherein the stabilizers are piston-and-cylinder units integrated in the lower links and oriented substantially orthogonally to a tractor longitudinal axis with piston rods having stabilizing jaws engaging cams extending in the direction of said axis on said bracket.

5. The three-point hitch defined in claim 2 wherein said lower links are composed of two link parts including a front link part and a rear link part, each of said front link parts being provided with a seat for said stabilizer.

6. The three-point hitch defined in claim 5 wherein each of said piston-and-cylinder units is pivotally mounted at a lower end in the respective mount and at an upper end to the respective lever.

7. The three-point hitch defined in claim 6 wherein said rods are pivotally connected to said levers and said lower links by respective bearings.

8. The three-point hitch defined in claim 2 wherein said upper link is a piston-and-cylinder unit pivotally connected to said bracket.

9. The three-point hitch defined in claim 2, further comprising a triangular-shaped structure pivotally connected to said links at said coupling points.

10. The three-point hitch defined in claim 2 wherein said piston-and-cylinder unit is provided with a displacement-measuring system connected to an electronic control unit.

* * * * *